(12) United States Patent
Crisan et al.

(10) Patent No.: US 10,645,174 B2
(45) Date of Patent: May 5, 2020

(54) ENABLING MULTIPLE SESSIONS IN A SINGLE BROWSER

(71) Applicant: Sage Intacct, Inc., San Jose, CA (US)

(72) Inventors: Valer-Alin Crisan, San Jose, CA (US); Georgios Spiliotis, Athens (GR)

(73) Assignee: Sage Intacct, Inc., San Jose, CA (US)

( * ) Notice: Subject to any disclaimer, the term of this patent is extended or adjusted under 35 U.S.C. 154(b) by 209 days.

(21) Appl. No.: 15/834,770

(22) Filed: Dec. 7, 2017

(65) Prior Publication Data
US 2019/0182336 A1 Jun. 13, 2019

(51) Int. Cl.
*G06F 15/173* (2006.01)
*H04L 29/08* (2006.01)

(52) U.S. Cl.
CPC .......... *H04L 67/141* (2013.01); *H04L 67/146* (2013.01)

(58) Field of Classification Search
CPC ............................ H04L 67/141; H04L 67/146
USPC ........................................................ 709/227
See application file for complete search history.

(56) References Cited

U.S. PATENT DOCUMENTS

| | | | | |
|---|---|---|---|---|
| 8,676,994 | B2* | 3/2014 | Manapragada | H04L 67/1008 709/223 |
| 8,892,768 | B2* | 11/2014 | Amemiya | H04L 67/1027 370/392 |
| 8,930,443 | B1* | 1/2015 | Warner | H04L 67/141 709/203 |
| 9,009,329 | B2* | 4/2015 | Malakapalli | H04L 67/08 709/204 |
| 9,015,226 | B2* | 4/2015 | Sullivan | H04L 67/14 709/203 |
| 9,413,830 | B2* | 8/2016 | Thompson | H04N 5/76 |
| 9,438,488 | B2* | 9/2016 | Joshi | H04L 43/026 |
| 9,584,328 | B1* | 2/2017 | Graham-Cumming | H04L 9/3263 |
| 9,756,020 | B2* | 9/2017 | Kaufman | H04L 63/029 |
| 9,942,299 | B2* | 4/2018 | Wei | H04L 67/02 |
| 10,135,700 | B2* | 11/2018 | Lugiai | H04L 67/36 |
| 10,263,868 | B1* | 4/2019 | Baldi | H04L 43/0876 |
| 10,284,670 | B1* | 5/2019 | Roche | H04L 67/125 |
| 2015/0319252 | A1* | 11/2015 | Momchilov | H04L 67/141 709/223 |
| 2017/0250853 | A1* | 8/2017 | Evans | G06F 21/53 |
| 2017/0250859 | A1* | 8/2017 | Gheorghe | H04L 41/0803 |
| 2017/0331789 | A1* | 11/2017 | Kumar | H04L 63/0272 |
| 2018/0109625 | A1* | 4/2018 | Jayaraman | H04L 67/141 |
| 2018/0288165 | A1* | 10/2018 | Fransazov | H04L 67/141 |
| 2018/0295134 | A1* | 10/2018 | Gupta | H04L 63/10 |

\* cited by examiner

*Primary Examiner* — Melvin H Pollack
(74) *Attorney, Agent, or Firm* — Raubvogel Law Office (57) ABSTRACT

Various embodiments allow a web application or product to provide multiple sessions within the context of a single browser, without making any changes to the embedded application. In at least one embodiment, a new proxy layer is introduced in the stack, along with extra logic in the main application to generate session-specific URLs for the embedded application. The new proxy layer causes the browser to invoke a unique URL per session for the embedded application, with its session information being tied to the unique URL. From the user's (and browser's) perspective, there are multiple sessions in the same browser.

30 Claims, 3 Drawing Sheets

ENABLING MULTIPLE SESSIONS IN A SINGLE BROWSER

TECHNICAL FIELD

The present document relates to techniques for managing and tracking sessions for web applications.

SUMMARY

In general, web applications are designed to allow only one session per browser. Accordingly, such web applications do not function effectively in connection with multi-session products.

For example, many websites such as salesforce.com and facebook.com support only one session per browser. In some cases, websites much as google.com may provide multiple sessions but only by including different session indexes in the URL; this requires changes to the application itself.

The present document describes techniques for allowing a web application or product to provide multiple sessions within the context of a single browser, without making any changes to the embedded application. This provides professional organizations (such as chartered professional accountants, or CPAs) with a consolidated view of all their clients, by enabling them to open multiple sessions simultaneously (one per client).

The described method and system also provide the ability to provide specific entity contexts for multi-entity shared tenants, for operational and reporting purposes. A logged-in user is able to select additional entity contexts intentionally or transparently in order to perform necessary data entries, data reviews, and reports. For example, suppose a user logs in at the top level of a shared multi-entity tenant. The user can then open slides into one or more entities of the tenant, each slide corresponding to a new browser window or tab with the application set to that context. The user can also click on various links in the application that open new windows/tabs and transparently change the context to another entity in those tabs. Each new context is handled by a different session; it is therefore useful to support multiple sessions in the same browser.

In at least one embodiment, the method and system operate in the context of a web application (referred to herein as the "main application"), that includes embedded web pages associated with an embedded application. In at least one embodiment, a new proxy layer is introduced, along with extra logic in the main application to generate session-specific URLs for the embedded application. The new proxy layer causes the browser to invoke a unique URL per session for the embedded application, with its session information being tied to the unique URL. From the user's (and browser's) perspective, this enables multiple sessions in the same browser.

By allowing a multi-session product to be embedded in a web application, without modifying the embedded application to support multiple sessions per browser, the described system and method provide additional functionality that would not otherwise be available when accessing the product via a browser. The ability to provide such functionality without making any changes to the embedded application yields significant advantages over prior art systems.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION OF THE EMBODIMENTS

The systems and methods set forth herein may be applied to many contexts in which it can be useful to embed a multi-session product into a single-session environment. For illustrative purposes, the description herein is set forth with respect to a web-based architecture in which web-based applications are accessed via a browser. One of skill in the art will recognize that the systems and methods described herein may be implemented in a wide variety of other contexts. In addition, the particular hardware arrangement depicted and described herein is a simplified example for illustrative purposes.

In some embodiments, one or more client devices 101, embedded application server(s) 102, and/or main application server(s) 103, as shown and described in connection with FIGS. 1 and 2, may be used to implement the system and method described herein. For illustrative purposes, therefore, the system and method may be described in the context of such a client/server architecture. One skilled in the art will recognize, however, that the system and method can be implemented using other architectures, such as for example a stand-alone computing device rather than a client/server architecture.

Further, the functions and/or method steps set forth below may be carried out by software running on the one or more of the client devices 101 and/or servers 102, 103. This software may optionally be multi-function software that is used to retrieve, store, manipulate, and/or otherwise use data stored in data storage devices and/or to carry out one or more other functions.

In this application, a "user" is an individual, enterprise, or other group, which may optionally include one or more users. A "data store" is any device capable of digital data storage. A data store may use any known hardware for nonvolatile and/or volatile data storage. A "data storage system" is a collection of data stores that can be accessed by multiple users. A "computing device" is any device capable of digital data processing. A "server" is a computing device that provides data storage, either via a local data store, or via connection to a remote data store. A "client device" is an electronic device that communicates with a server, provides output to a user, and accepts input from a user.

System Architecture

According to various embodiments, the system can be implemented on any one or more suitable electronic devices equipped to receive, store, and present information. Such electronic devices may include, for example, any combination of server(s), desktop computer(s), laptop computer(s), smartphone(s), tablet(s), wearable computing device(s), and/or the like.

Although the system is described herein in connection with an implementation in a client/server architecture, one skilled in the art will recognize that the techniques described herein can be implemented in other contexts, and indeed in any suitable device. Accordingly, the following description is intended to illustrate various embodiments by way of example, rather than to limit scope.

In general, single-session web applications maintain state by reliance on information stored in the browser and associated with the application domain. Such information can be stored, for example, in a cookie that is stored locally at the client device. Each request to the web application domain includes the cookie, or includes information derived from the cookie, thus allowing the web application to retrieve the appropriate session information on the server side and thereby continuation the user's interaction with the web application. The browser associates the cookie with the application's domain (the host name part of the URL) and in some cases with the domain path (the path portion of the URL), so as to ensure that the correct cookie is retrieved for each interaction.

Figure 1:
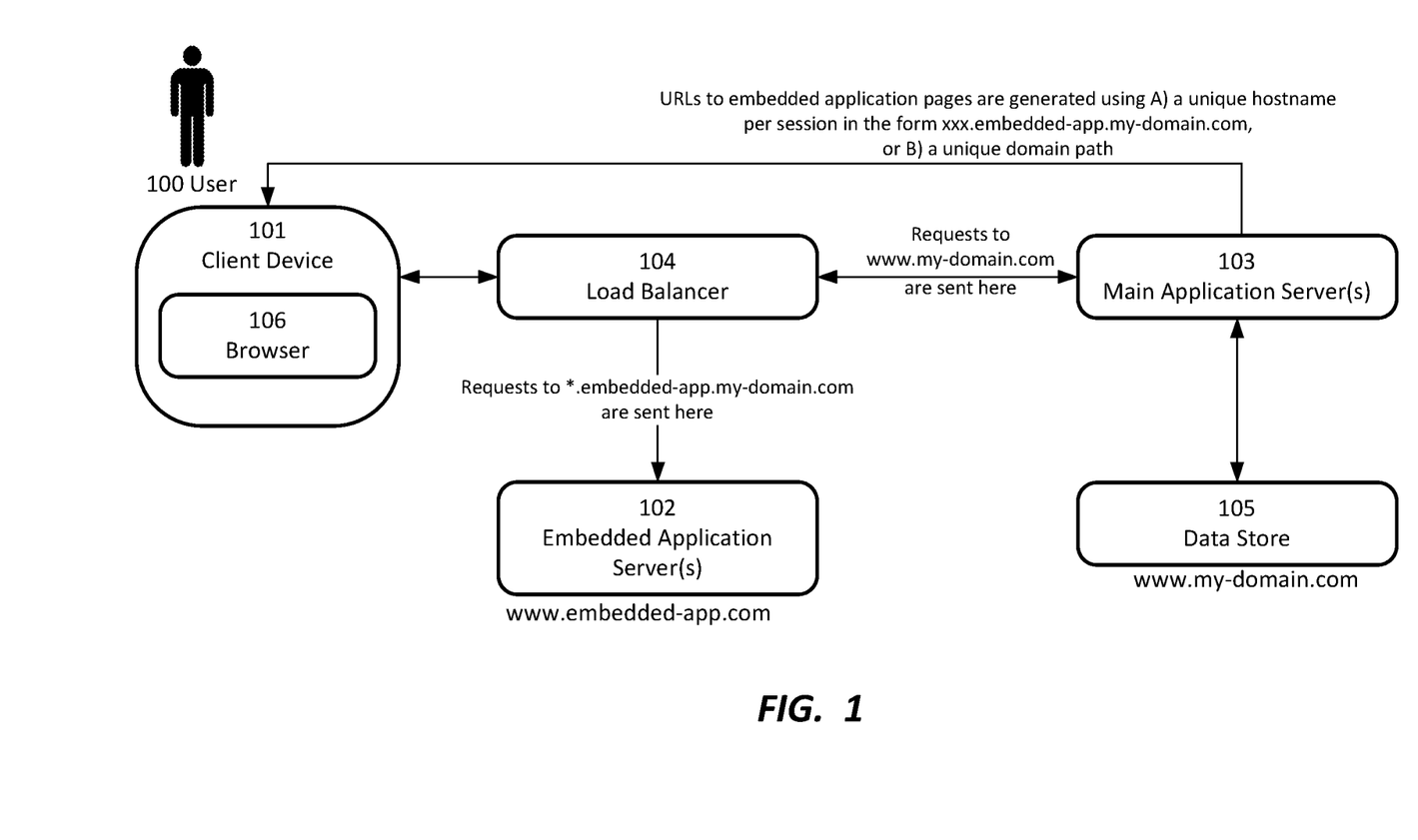
FIG. 1 is a block diagram depicting a hardware architecture for providing multiple sessions within the context of a single browser, according to one embodiment.

Referring now to FIG. 1, there is shown a block diagram depicting a hardware architecture for providing multiple sessions within the context of a single browser, according to one embodiment. Client device(s) 101, server(s) 102, 103, and load balancer 104 may be any suitable electronic devices configured to perform the steps described herein. In at least one embodiment, client device 101 includes functionality for running browser 106 or similar software for accessing websites over a network such as the Internet. Load balancer 104 can be any electronic component designed to distribute workload across computing resources, according to known techniques.

Each server 103 includes one or more data store(s) 105, each of which can store data according to any suitable protocol. In at least one embodiment, data can be organized into one or more databases. Any number of data store(s) 105 can be provided. Each database may include one or more well-ordered data sets, which may include data records, metadata, and/or other data (not shown). Each data set may include one or more data entries. Data store(s) 105, however, can have any suitable structure. Accordingly, the particular organization of data store(s) 105 need not resemble the form in which information from data store(s) 105 is displayed to user 100. In at least one embodiment, an identifying label is also stored along with each data entry, to be displayed along with each data entry.

In at least one embodiment, data store(s) 105 may be organized in a file system, using well known storage architectures and data structures, such as relational databases. Examples include Oracle, MySQL, and PostgreSQL. Appropriate indexing can be provided to associate data elements in data store(s) 105 with each other.

Client device(s) 101, embedded application server(s) 102, and main application server(s) 103 communicate with load balancer 104 via any suitable communications network, such as the Internet, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, browser 106 running on client device 101 transmits requests for data via the communications network, and receives responses from server(s) 102, 103 (via load balancer 104) containing the requested data, as described in more detail below. Such requests may be sent via HTTP as remote procedure calls or the like. The communications network may employ any known technologies to ensure secure communications between client device(s) 101, embedded application server(s) 102, main application server(s) 103, and load balancer 104.

In at least one embodiment, server(s) 103 may include additional components as needed for retrieving data from data store 105 in response to requests from client device 101.

In some embodiments, the data within data store 105 of server 103 may be distributed among multiple physical servers. Thus, server 103 as depicted in FIG. 1 may represent one or more physical servers, which may communicate with each other via the communications network and/or one or more other networks (not shown).

Figure 2:
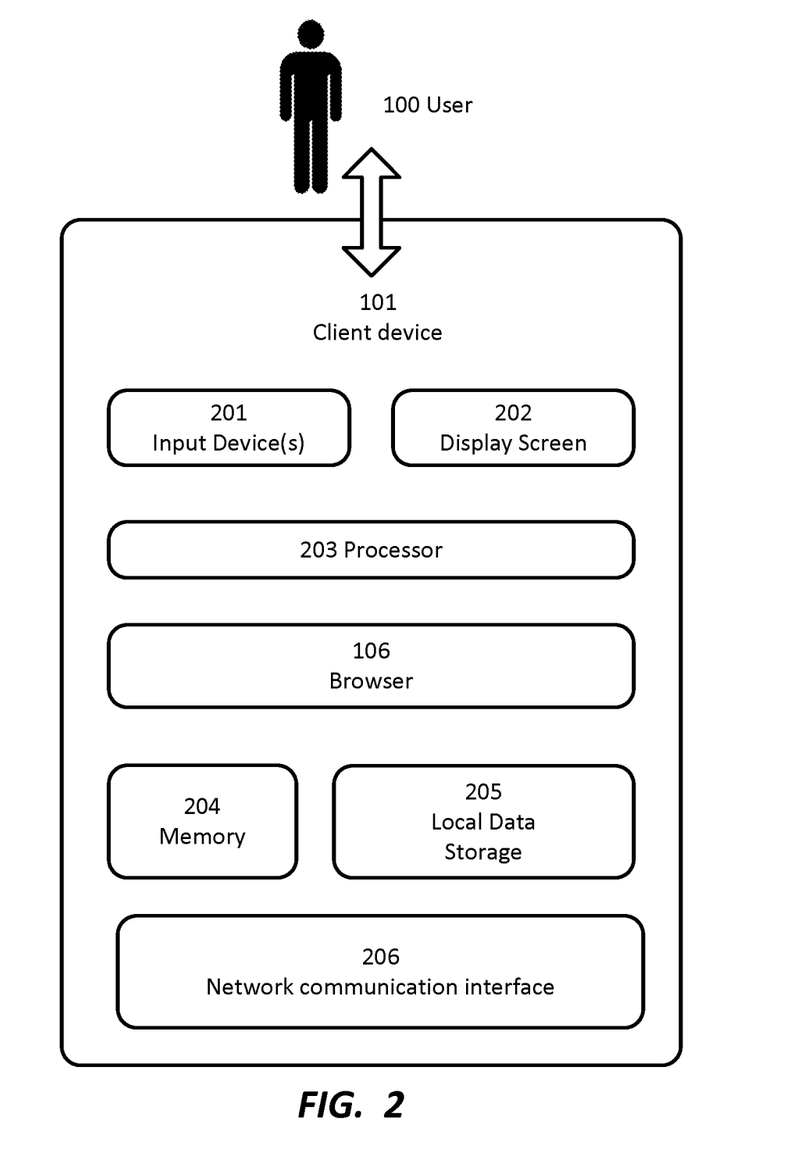
FIG. 2 is a block diagram depicting a hardware architecture for a client device that can be used in connection with the overall architecture depicted in FIG. 1, according to one embodiment.

Referring now to FIG. 2, there is shown a block diagram depicting a hardware architecture for a client device 101 that can be used in connection with the overall architecture depicted in FIG. 1, according to one embodiment. User 100 interacts with client device 101 by providing input to device 101 and by viewing output presented by device 101. Such interactions are described in more detail herein.

In at least one embodiment, client device 101 can be any suitable electronic device and can include a number of hardware components that are well-known to those skilled in the art. Input device(s) 201 can include any element(s) that receive input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Display screen 202 can be any element that graphically displays information, such as data from server(s) 102, 103, and/or from data store(s) 105, as well as user interface elements that can facilitate interaction with such information. In at least one embodiment where only some of the desired output is presented at a time, a dynamic control, such as a scrolling mechanism, may be available via input device 201 to change which information is currently displayed, and/or to alter the manner in which the information is displayed.

Local data storage 205 can be any magnetic, optical, or electronic storage device for data in digital form; examples include magnetic hard drive, CD-ROM, DVD-ROM, flash drive, USB hard drive, or the like. In various embodiments, local data storage 205 is detachable or removable from client device 101, or it may be is fixed within client device 101.

In at least one embodiment, local data storage 205 stores information that can be utilized and/or displayed according to the techniques described below. Local data storage 205 may be implemented in a database or using any other suitable arrangement. In another embodiment, data can be stored elsewhere, and retrieved by client device 101 when needed for presentation to user 100. Local data storage 205 may store one or more data sets, which may be used for a variety of purposes and may include a wide variety of files, records, and/or other data. In at least one embodiment, data can be stored in local data storage 205, either in whole or in part, instead of or in addition to being stored at data store(s) 105 associated with server(s) 103.

In some embodiments, records from data store(s) 105 can include elements distributed between server 103 and client device 101 and/or other computing devices in order to facilitate secure and/or effective communication between these computing devices. In some embodiments, such records may all be stored primarily on server 103, and may be downloaded to client device 101 when needed by the user 100 for viewing and/or modification according to the techniques described herein. When viewing or modification is complete, the records may be updated on server 103. The corresponding copies of the records on client device 101 may be deleted.

Local data storage 205 can be local or remote with respect to the other components of client device 101. In at least one embodiment, client device 101 is configured to retrieve data from a remote data storage device when needed. Such communication between client device 101 and other components can take place wirelessly, by Ethernet connection, via a computing network such as the Internet, via a cellular network, or by any other appropriate means.

Processor 203 can be a conventional microprocessor for performing operations on data under the direction of software, according to well-known techniques. Memory 204 can be random-access memory, having a structure and architecture as are known in the art, for use by processor 203 in the course of running software, presenting information to user 100, receiving input from user 100, and/or communicating with other components of the system.

In at least one embodiment, the system is implemented using a "black box" approach, whereby data storage and processing are done independently from user input/output. An example of such an approach is a webbased implementation, wherein client device 101 runs browser 106 that provides a user interface for interacting with web pages and/or other web-based resources generated by server(s) 102, 103. Items from server(s) 102, 103 can be presented as part of such web pages and/or other web-based resources, using known protocols and languages such as Hypertext Markup Language (HTML), Java, JavaScript, and the like.

Client device 101 can be any electronic device incorporating the elements depicted in FIG. 2, such as a desktop computer, laptop computer, personal digital assistant (PDA), cellular telephone, smartphone, music player, handheld computer, tablet computer, kiosk, game system, wearable device, or the like.

In one embodiment, some or all components of the system can be implemented as software written in any suitable computer programming language, whether in a standalone or client/server architecture. Alternatively, it may be implemented and/or embedded in hardware.

Operation

The architecture depicted in FIG. 1 provides the ability to maintain multiple sessions for the same web application within a single browser 106. In various embodiments, this is accomplished by providing either A) a unique host name for each session or B) a unique domain path for each session.

A) Unique Host Name

In at least one embodiment, a unique host name is provided for each session. Load balancer 104 implements a redirection layer that serves all incoming requests to a particular sub-domain, and forwards them to an embedded web application domain. For example, load balancer 104 can send incoming requests to "embedded-app.mydomain.com" to embedded application server(s) 102 running the embedded web-application domain called "embedded-app.com". An algorithm in the main application running on main application server(s) 103 generates a unique name for the sub-domain based on the criteria needed for the multi-sessions. In this example, such unique names can take the form "xxx.embedded-app.my-domain.com". In at least one embodiment, the criteria can be the session key of the main application, although other approaches are possible.

B) Unique Domain Path

The above description sets forth an embodiment in which a unique host name is generated for each session. Such an approach can be useful, for example, when the application being embedded generates absolute path URLs, thus making it more difficult to manipulate the domain path. In an alternative embodiment, as mentioned above, a unique domain path can be generated for each session; such an approach can be used, for example, with applications that build relative path URLs in their responses, as is common in most modern web applications.

If embedded application server 102 generates only relative path URLs, it is agnostic as to the root path; in other words, any arbitrary root path can be used. Main application server 103 generates URLs for embedded application server 102 using a path prefix that is unique for its session. For example, if a URL needs to point to www.embedded-app.com/path/file.html, main application server 103 generates a URL such as https://www.embedded-app.my-domain.com/unique_path_prefix/path/file.html. Load balancer 104 uses rules to detect the patterns of the unique path prefix. When detecting such a URL, it removes that added portion from the URL, and sends the request to embedded application server 102 along with the rest of the path.

If, on the other hand, embedded application uses absolute path URLs, load balancer 104 (or some other proxy layer or other component) parses the requests and replaces all absolute paths with new absolute paths that contain the unique path segment introduced by main application server 103.

The request is thus sent to embedded application server 102 using the correct path, since load balancer 104 removes the additional prefix that was added by main application sever 103.

Responses from embedded application server(s) 102 generally include URLs with relative paths. Therefore, upon receiving such URLs, browser 106 transforms them into absolute URLs by pre-pending the hostname and the path of the request. For example, if a link in a response from embedded application server 102 has the relative URL../path2/otherfile.html, then browser 106 generates the absolute URL https://www.embedded-app.my-domain.com/unique_path_prefix/path/../path2/otherfile.html from this link.

Further requests from 106 match the same pattern in load balancer 104, and are therefore transformed and routed to embedded application server 102 in the same manner as the initial request.

In at least one embodiment, the stored cookie is associated with the hostname and the path for the application that generated it. In this case, the hostname is common for all cookies set by embedded application server 102, and the path is unique for each user session. Thus, the system ensures that there is a different set of cookies for each user session in the same browser 106.

The described techniques are not dependent on main application server(s) 103 hosting the embedded application internally. To the contrary, the techniques can operate in connection with an embedded application that resides in a set of servers that may be accessed using a domain name that is different than the domain name of the main application, and are therefore separate from main web application servers 103. Thus, the system and method are not limited to an architecture wherein the embedded application is hosted with the main application, but rather can also be implemented in a situation where the embedded application is hosted somewhere else on the Internet.

In at least one embodiment, the described system can be extended to include multiple instances of the embedded web application, thus providing improved scalability. Specifically, such an arrangement provides improved horizontal scalability by permitting the explicit allocation of resources (tenants) per instance as opposed to building a large cluster to handle all resources. Inclusion of multiple instances also provides the ability to partition data and/or resources so as to provide better distribution based on desired criteria.

In at least one embodiment, multiple instances can be provided by, for example, by adding extra logic to the sub-domain name. For example, subdomains can be constructed from two parts separated by a dash:

A first part is the unique name of the sub domain based on the multi-session criteria;

A second part is a number indicating the instance ID.

In at least one embodiment, load balancer 104 can be configured so as to parse the sub-domain text, extract the instance ID from it, and route the request to the appropriate instances based on the extracted instance ID.

For example a request in the form

```
4a2c8855874375abe0530211e20a1fe2u25e0-03.embedded-app.my-domain.com
``` is routed to the embedded web application running on "embed-03.embedded-app.com", wherein the "03" indicates the instance ID.

In at least one embodiment, the described system can operate in connection with encrypted communications between browser 106 and server(s) 103, via protocols such as HTTPS. Since the system makes requests to a domain with a potentially arbitrary sub-domain name, a regular HTTP certificate cannot be used. Therefore, in at least one embodiment, a wild-card DNS certificate is constructed and used. The wild-card DNS certificate is installed in load balancer 104, so that communications between browser 106 and load balancer 104 are performed over HTTPS using the wild-card DNS certificate. Communications between load balancer 104 and embedded application server(s) 102 can be performed via regular HTTP (if safe, for example in the situation where both components are in the same internal network) or via HTTPS using a standard, single-domain certificate.

Figure 3:
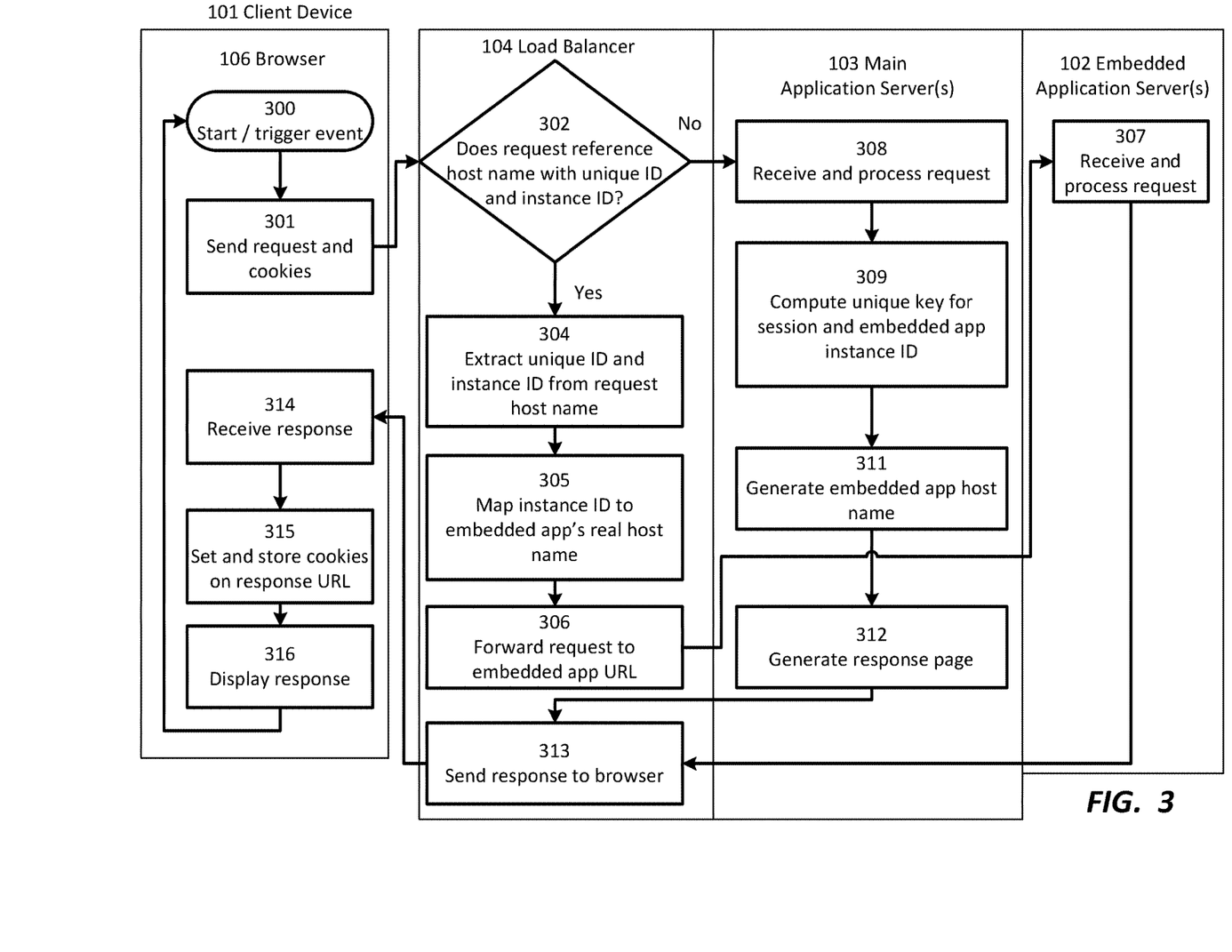
FIG. 3 is a flow diagram depicting a method for providing multiple sessions within the context of a single browser, according to one embodiment.

Referring now to FIG. 3, there is shown a flow diagram depicting a method for providing multiple sessions within the context of a single browser, according to one embodiment. For illustrative purposes, the method is depicted in FIG. 3 as it may be implemented using the architecture of FIGS. 1 and 2, although one skilled in the art will recognize that it can be implemented with other architectures as well.

The method begins with step 301, in which browser 106 running on client device 101 initiates 301 a request for a resource, for example in response to user input or some other trigger event 300. The request includes state information for browser 106, for example as stored locally in cookies.

Load balancer 104 receives the request, and determines 302 whether the request references a host name comprising a unique identifier and instance identifier. In at least one embodiment, load balancer 104 operates on rules, each of which specifies a destination for a particular combination of request host, port, and/or path. For example, there may be one rule for the main app domain, www.mydomain.com and another rule for the embedded app domain, *.embedded-app.my-domian.com. If the request fits the main domain, it is sent to the main app server(s). If the request fits the embedded app domain, then the load balancer 104 attempts to extract the unique id and the instance id from the domain, and then, if the attempt succeeds, it builds a new host based on the instance id and sends the request there.

If the request does not reference a host name comprising a unique identifier and instance identifier, load balancer 104 forwards the request to a main application server 103. Main application server 103 receives 308 and processes the request. It computes 309 a unique key for the session and an embedded app instance ID. It then generates 311 an embedded app host name using the unique key and instance ID, for example using a form such as <unique_id>_<instance_id>.embedded-app.my-domain.com. The response page is then generated 312 using the generated host name in any links included in the page.

If the request does reference a host name comprising a unique identifier and instance identifier, load balancer 104 performs steps 304 to 306. First, it extracts 304 the unique ID and instance ID from the request host name. Then, it constructs a resource locator (such as a URL) by mapping 305 the identified instance to an actual host name for the embedded application. Finally, it forwards 306 the request to the appropriate embedded application server 102, based on the constructed resource locator. Embedded application server 102 receives 307 and processes the request in accordance with its logic.

Responses from main application server(s) 103 and embedded application server(s) 102 are received at load balancer 104, which then sends 313 the response to browser 106 at client device 101. Browser 106 receives 314 the response, sets 315 and stores cookies on the response URL, and displays 316 the response on an output device such as display screen 202. In at least one embodiment, browser 106 stores cookies associated with the domain and path of the request URL initiated by browser 106, rather than the rewritten URL produced by load balancer 104, since the latter is not visible to browser 106.

In at least one embodiment, embedded application server 102 specifies cookie values in its response sent to browser 106, but does not explicitly name the domain on which the cookie is set. Therefore, browser 106 associates the cookie with the request domain, which is the unique host name provided by load balancer 104 for the request. Since load balancer 104 uses the same unique name for each request in a session, embedded application server 102 only sees one session associated with that unique name.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A method for enabling multiple concurrent sessions in a single browser context, the method comprising:
   at a proxy layer, receiving a request from a client device within a previously established browser context, the request being associated with either a new session or one of a plurality of concurrent sessions within the previously established browser context;

at the proxy layer, determining whether the received request is associated with a new session or one of the plurality of concurrent sessions, by determining whether the request references a host name comprising a unique identifier and instance identifier;

at the proxy layer, responsive to the request not referencing a host name comprising a unique identifier and instance identifier, forwarding the request to a main application server for generation of a unique session key associated with a new session within the previously established browser context, and for mapping of an instance identifier to the request;

at the proxy layer, responsive to the request referencing a host name comprising a unique identifier and instance identifier, performing the steps of:

extracting the unique identifier and instance identifier from the host name, so as to identify one of the plurality of concurrent sessions within the previously established browser context;

constructing a resource locator from the extracted unique identifier; and forwarding the request to a server identified by the constructed resource locator so that the request is handled within the identified session;

at the proxy layer, receiving a response from the server to which the request was forwarded; and forwarding the received response from the proxy layer to the client device.

2. The method of claim 1, wherein constructing the resource locator comprises mapping the extracted identifier to a real host name for an embedded application server.

3. The method of claim 2, wherein forwarding the request to the server identified by the constructed resource locator comprises:

using a redirection layer to forward an incoming request addressed to a previously established sub-domain to an embedded web application domain.

4. The method of claim 2, wherein forwarding the request to the server identified by the constructed resource locator comprises forwarding the request to the embedded application server.

5. The method of claim 4, wherein the embedded application server comprises multiple instances of an embedded web application.

6. The method of claim 1, wherein constructing the resource locator comprises combining at least a portion of the request with a unique domain path prefix corresponding to a session.

7. The method of claim 6, wherein forwarding the request to the server identified by the constructed resource locator comprises:

detecting a pattern corresponding to a previously inserted domain path prefix; and removing a portion of the resource locator corresponding to the previously inserted domain path prefix.

8. The method of claim 1, wherein receiving the request from the client device comprises receiving the request from a browser running at the client device.

9. The method of claim 1, wherein receiving the request from the client device comprises receiving a request comprising cookie data.

10. The method of claim 1, wherein:

forwarding the request to the main application server for generation of the unique session key and for mapping of the instance identifier to the request comprises forwarding the request to the main application server using an encrypted communications channel;

forwarding the request to the server identified by the constructed resource locator comprises forwarding the request to the server identified by the constructed resource locator using the encrypted communications channel; and forwarding the received response from the load balancer to the client device comprises forwarding the received response from the load balancer to the client device using the encrypted communications channel.

11. A non-transitory computer-readable medium for enabling multiple concurrent sessions in a single browser context, comprising instructions stored thereon, that when executed by one or more processors at a proxy layer, perform the steps of:

receiving a request from a client device within a previously established browser context, the request being associated with either a new session or one of a plurality of concurrent sessions within the previously established browser context;

determining whether the received request is associated with a new session or one of the plurality of concurrent sessions, by determining whether the request references a host name comprising a unique identifier and instance identifier;

responsive to the request not referencing a host name comprising a unique identifier and instance identifier, forwarding the request to a main application server for generation of a unique session key associated with a new session within the previously established browser context, and for mapping of an instance identifier to the request;

responsive to the request referencing a host name comprising a unique identifier and instance identifier, performing the steps of:

extracting the unique identifier and instance identifier from the host name, so as to identify one of the plurality of concurrent sessions within the previously established browser context;

constructing a resource locator from the extracted unique identifier; and forwarding the request to a server identified by the constructed resource locator so that the request is handled within the identified session;

receiving a response from the server to which the request was forwarded; and causing the received response to be forwarded from the proxy layer to the client device.

12. The non-transitory computer-readable medium of claim 11, wherein constructing the resource locator comprises mapping the extracted identifier to a real host name for an embedded application server.

13. The non-transitory computer-readable medium of claim 12, wherein forwarding the request to the server identified by the constructed resource locator comprises:

using a redirection layer to forward an incoming request addressed to a previously established sub-domain to an embedded web application domain.

14. The non-transitory computer-readable medium of claim 12, wherein forwarding the request to the server identified by the constructed resource locator comprises forwarding the request to the embedded application server.

15. The non-transitory computer-readable medium of claim 14, wherein the embedded application server comprises multiple instances of an embedded web application.

16. The non-transitory computer-readable medium of claim 11, wherein constructing the resource locator comprises combining at least a portion of the request with a unique domain path prefix corresponding to a session.

17. The non-transitory computer-readable medium of claim 16, wherein forwarding the request to the server identified by the constructed resource locator comprises:
   detecting a pattern corresponding to a previously inserted domain path prefix; and
   removing a portion of the resource locator corresponding to the previously inserted domain path prefix.

18. The non-transitory computer-readable medium of claim 11, wherein receiving the request from the client device comprises receiving the request from a browser running at the client device.

19. The non-transitory computer-readable medium of claim 11, wherein receiving the request from the client device comprises receiving a request comprising cookie data.

20. The non-transitory computer-readable medium of claim 11, wherein:
   forwarding the request to the main application server for generation of the unique session key and for mapping of the instance identifier to the request comprises forwarding the request to the main application server using an encrypted communications channel;
   forwarding the request to the server identified by the constructed resource locator comprises forwarding the request to the server identified by the constructed resource locator using the encrypted communications channel; and
   forwarding the received response from the load balancer to the client device comprises forwarding the received response from the load balancer to the client device using the encrypted communications channel.

21. A system for enabling multiple concurrent sessions in a single browser context, the system comprising:
   a client device, configured to run a browser; and
   a proxy layer, configured to perform the steps of:
      receiving a request from the browser running at the client device, the request being within a previously established browser context, the request being associated with either a new session or one of a plurality of concurrent sessions within the previously established browser context;
      determining whether the received request is associated with a new session or one of the plurality of concurrent sessions, by determining whether the request references a host name comprising a unique identifier and instance identifier;
      responsive to the request not referencing a host name comprising a unique identifier and instance identifier, forwarding the request to a main application server for generation of a unique session key associated with a new session within the previously established browser context, and for mapping of an instance identifier to the request;
      responsive to the request referencing a host name comprising a unique identifier and instance identifier, performing the steps of:
         extracting the unique identifier and instance identifier from the host name, so as to identify one of the plurality of concurrent sessions within the previously established browser context;
         constructing a resource locator from the extracted unique identifier; and
         forwarding the request to a server identified by the constructed resource locator so that the request is handled within the identified session;
      receiving a response from the server to which the request was forwarded; and
      forwarding the received response from the proxy layer to the client device.

22. The system of claim 21, wherein constructing the resource locator comprises mapping the extracted identifier to a real host name for an embedded application server.

23. The system of claim 22, wherein forwarding the request to the server identified by the constructed resource locator comprises:
   using a redirection layer to forward an incoming request addressed to a previously established sub-domain to an embedded web application domain.

24. The system of claim 22, wherein forwarding the request to the server identified by the constructed resource locator comprises forwarding the request to the embedded application server.

25. The system of claim 24, wherein the embedded application server comprises multiple instances of an embedded web application.

26. The system of claim 21, wherein constructing the resource locator comprises combining at least a portion of the request with a unique domain path corresponding to a session.

27. The system of claim 26, wherein forwarding the request to the server identified by the constructed resource locator comprises:
   detecting a pattern corresponding to a previously inserted domain path prefix; and
   removing a portion of the resource locator corresponding to the previously inserted domain path prefix.

28. The system of claim 21, wherein receiving the request from the client device comprises receiving the request from a browser running at the client device.

29. The system of claim 21, wherein receiving the request from the client device comprises receiving a request comprising cookie data.

30. The system of claim 21, wherein:
   forwarding the request to the main application server for generation of the unique session key and for mapping of the instance identifier to the request comprises forwarding the request to the main application server using an encrypted communications channel;
   forwarding the request to the server identified by the constructed resource locator comprises forwarding the request to the server identified by the constructed resource locator using the encrypted communications channel; and
   forwarding the received response from the load balancer to the client device comprises forwarding the received response from the load balancer to the client device using the encrypted communications channel.

* * * * *